United States Patent
Kwon

(10) Patent No.: US 10,175,819 B2
(45) Date of Patent: Jan. 8, 2019

(54) ORGANIC LIGHT EMITTING DISPLAY DEVICE WITH TOUCH SENSING FUNCTION

(71) Applicant: LG Display Co., Ltd., Seoul (KR)

(72) Inventor: OhJong Kwon, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 14 days.

(21) Appl. No.: 14/832,191

(22) Filed: Aug. 21, 2015

(65) Prior Publication Data

US 2016/0062548 A1 Mar. 3, 2016

(30) Foreign Application Priority Data

Sep. 1, 2014 (KR) .......................... 10-2014-0115362

(51) Int. Cl.
*G06F 3/041* (2006.01)
*G09G 3/3225* (2016.01)
*G06T 1/20* (2006.01)
*G09G 5/00* (2006.01)
*G02F 1/1333* (2006.01)

(52) U.S. Cl.
CPC .......... *G06F 3/0418* (2013.01); *G06F 3/0412* (2013.01); *G06F 3/0416* (2013.01); *G06T 1/20* (2013.01); *G09G 3/3225* (2013.01); *G09G 5/003* (2013.01); *G02F 1/13338* (2013.01); *G09G 2310/08* (2013.01); *G09G 2320/041* (2013.01)

(58) Field of Classification Search
CPC .... G06F 3/0412; G06F 3/0416; G06F 3/0418; G09G 3/3225; G09G 2320/041; G09G 5/003; G09G 2310/08; G02F 1/13338; G06T 1/20

USPC ...................... 345/173–178; 178/18.01–18.09
See application file for complete search history.

(56) References Cited

U.S. PATENT DOCUMENTS 8,890,817 B2 * 11/2014 Wilson .................. G06F 3/0416
345/173
2008/0224962 A1 9/2008 Kasai et al.
(Continued)

FOREIGN PATENT DOCUMENTS

CN 102402330 A 4/2012
CN 102439548 A 5/2012
(Continued)

OTHER PUBLICATIONS

European Extended Search Report, European Application No. 15183314.2, dated Feb. 1, 2016, 8 pages.
(Continued)

*Primary Examiner* — Stacy Khoo
(74) *Attorney, Agent, or Firm* — Fenwick & West LLP

(57) ABSTRACT

Disclosed is a timing controller for a display panel comprising: a mode controller arranged to operate a display panel in one of a sensing mode or a display mode; a sensing controller arranged to obtain sensed data associated with a transistor during the sensing mode, the transistor corresponding to a touch recognition area of the display panel; a touch controller arranged to compare a change value of the sensed data with a touch critical range; wherein the touch controller is further arranged to extract position information or identification information on the touch recognition area if the change value is within the touch critical range.

14 Claims, 13 Drawing Sheets

(56) References Cited

U.S. PATENT DOCUMENTS

| | | | | |
|---|---|---|---|---|
| 2009/0058831 A1* | 3/2009 | Chen | ................... | G06F 3/044 |
| | | | | 345/174 |
| 2010/0188363 A1* | 7/2010 | Ikeda | ................... | G06F 3/044 |
| | | | | 345/174 |
| 2010/0231528 A1* | 9/2010 | Wolfe et al. | ............ | G06F 3/041 |
| | | | | 345/173 |
| 2010/0253638 A1* | 10/2010 | Yousefpor | ............. | G06F 3/0412 |
| | | | | 345/173 |
| 2011/0063537 A1* | 3/2011 | Kim | ................... | G02F 1/13338 |
| | | | | 349/42 |
| 2012/0242597 A1* | 9/2012 | Hwang | ................. | G06F 3/0412 |
| | | | | 345/173 |
| 2014/0111466 A1 | 4/2014 | Kim et al. | | |
| 2014/0285462 A1* | 9/2014 | Lee | ................... | G09G 3/3648 |
| | | | | 345/173 |
| 2015/0062076 A1* | 3/2015 | Pan | ................... | G06F 3/0412 |
| | | | | 345/174 |

FOREIGN PATENT DOCUMENTS

| | | | |
|---|---|---|---|
| CN | 203311812 U | | 11/2013 |
| EP | 2336857 A2 | | 6/2011 |
| KR | 1020140094165 | * | 7/2014 |

OTHER PUBLICATIONS

Chinese First Office Action, Chinese Application No. 201510550172.0, dated Jul. 3, 2017, 22 pages.

* cited by examiner

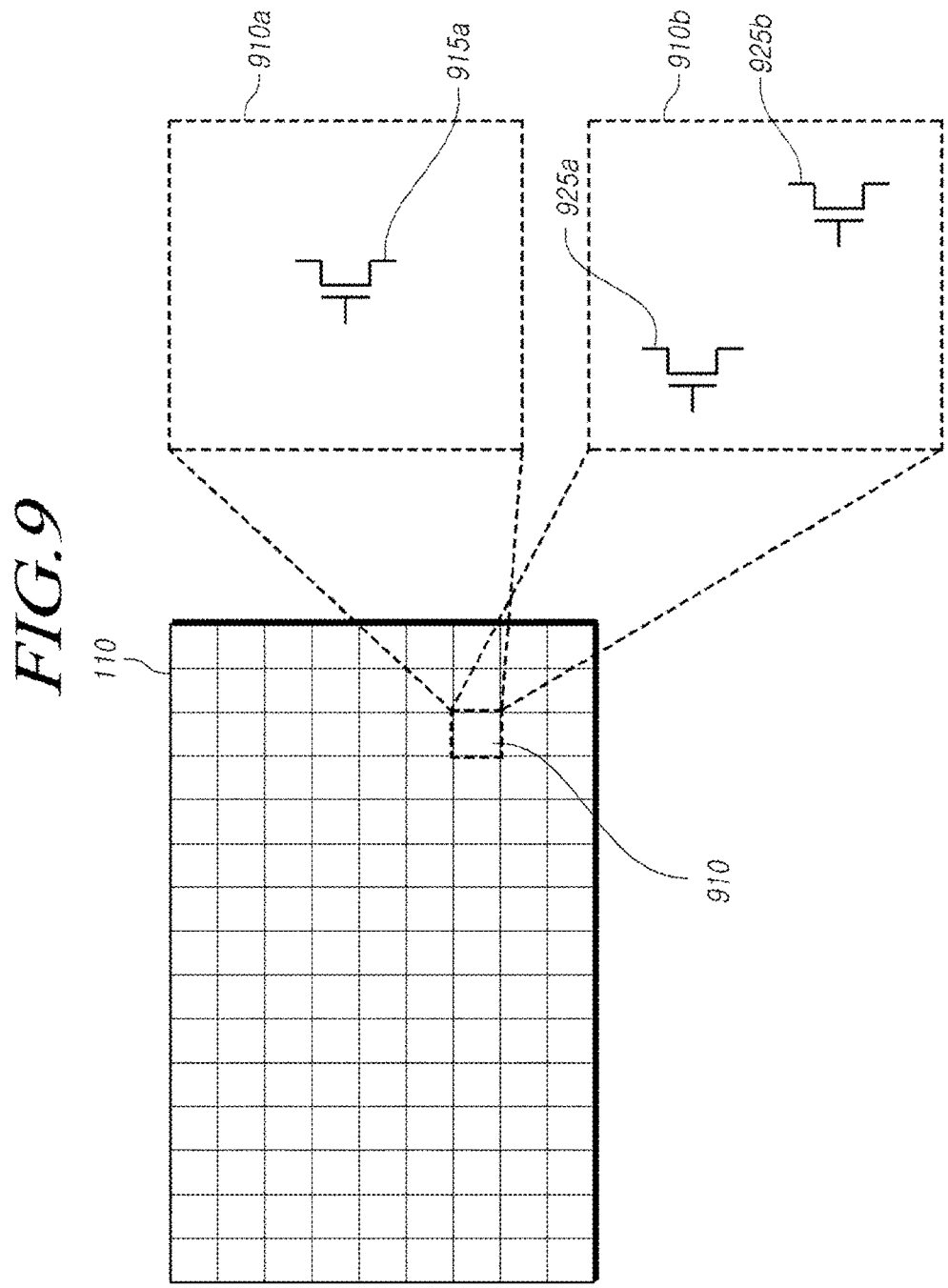

ORGANIC LIGHT EMITTING DISPLAY DEVICE WITH TOUCH SENSING FUNCTION

CROSS-REFERENCE TO RELATED APPLICATIONS

This application claims priority from and the benefit under 35 U.S.C. § 119(a) of Korean Patent Application No. 10-2014-0115362, filed on Sep. 1, 2014, which is hereby incorporated by reference for all purposes as if fully set forth herein.

BACKGROUND

1. Field of the Invention

The present disclosure relates to an organic light emitting display device with a touch sensing function.

2. Description of the Prior Art

With the development of information technology, demands for various display devices for display images have increased, and many types of display devices, such as liquid crystal display devices (LCD), plasma display devices, or organic light emitting display devices (OLED), have been used. In addition, touch panels have been widely developed in order to touch the image displayed on the display device and identify the result thereof for an interactive operation with the devices.

However, the touch panel should be configured as a separate component, or should be combined to the display device, which brings about a complicated process and a high cost in manufacturing the display device. Accordingly, a display panel, which can be made through a simple manufacturing process and can effectively sense a touch position, is required.

SUMMARY

Aspects of an invention are defined in the appended independent claims.

There is provided a timing controller that provides a touch sensing function using a change in the temperature of the touch panel where a touch event occurs, and an organic light emitting display device adopting the same.

In addition, there is provided technology by which the touch position may be recognized using the sensed data of a transistor, which is obtained through an external compensation operation, and changes in the threshold voltage and the mobility of the touched transistor.

There is provided a timing controller that compares a change value of data sensed in a transistor with a touch critical range to detect a touch on the display panel.

There is provided an organic light emitting display device that may include a display panel in which a plurality of touch recognition areas is configured, and a timing controller that compares a change value of data sensed in a representative transistor of the plurality of touch recognition areas in a sensing mode with a touch critical range to detect a touch.

There is provided a method that includes sensing a display panel, comparing a change value of a representative transistor corresponding to each of the touch recognition areas of the display panel with a touch critical range, and providing information on the touch recognition area where a touch is detected.

As described above, an effect is provided in which a touch can be sensed using changes in the properties of a transistor of the display device without a separate touch panel for sensing the touch.

When the transistor of a display device is changed in the temperature due to a touch from the outside and thus the threshold voltage and the mobility thereof are changed, such changes may be sensed in a sensing mode to recognize that the touch has been made at the position corresponding to the transistor on the basis of the changed properties.

Since a touch sensing function is provided during an external compensation process operated in the display panel, defects of the fabrication process, which results from the provision of a separate circuit in the conventional display panel, can be eliminated. In addition, since the touch is detected through a timing controller that adopts a touch controller for detecting a touch, a separate touch panel is not necessary and thereby reduces the manufacturing cost.

Touch recognition areas for detecting touches may be variously configured according to the properties of the display panel to thereby improve the accuracy of touch recognition.

BRIEF DESCRIPTION OF THE DRAWINGS

The above and other objects, features and advantages will be more apparent from the following detailed description taken in conjunction with the accompanying drawings, in which:

FIGS. 9 to 11 illustrate a configuration of a touch recognition area according to an embodiment;

DETAILED DESCRIPTION

Figure 1:
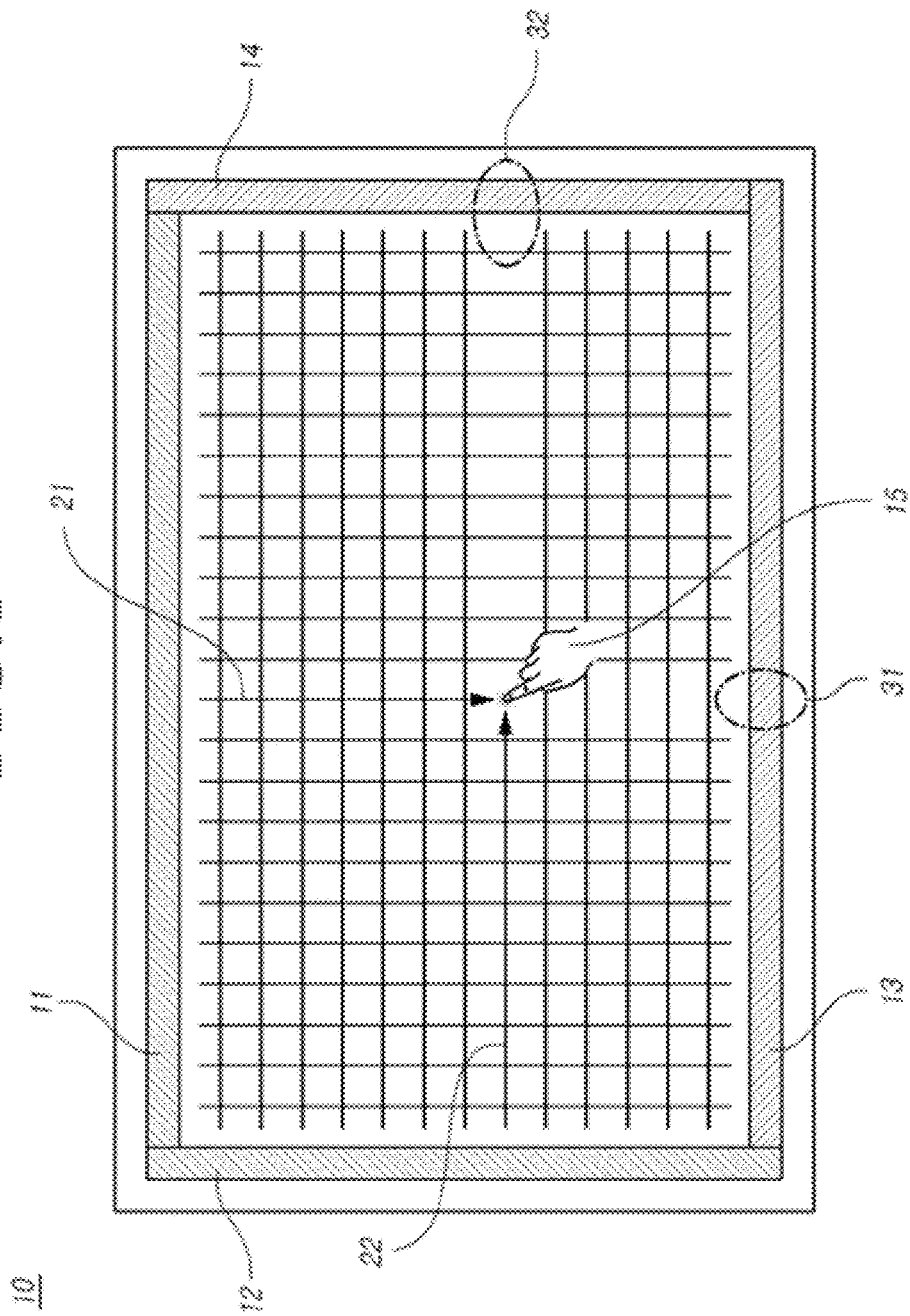
FIG. 1 illustrates a conventional display device that executes a touch function using external infrared sensors.

Hereinafter, exemplary embodiments will be described with reference to the accompanying drawings. In the following description, the same elements will be designated by the same reference numerals although they are shown in different drawings. Further, in the following description a detailed description of known functions and configurations incorporated herein will be omitted when it may make the subject matter disclosed herein rather unclear.

In addition, terms, such as first, second, A, B, (a), (b) or the like may be used herein when describing components disclosed herein. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates a conventional display device that executes a touch function using external infrared sensors. The configuration of FIG. 1 is generally applied to large scale display devices, and a device, which can detect a touch using external infrared sensors, is provided outside the display panel. That is, an infrared light is emitted from one side, and the infrared light is detected at the other side wherein if the infrared light is not detected, it is determined that a touch has been made on the display device to thereby recognize coordinates thereof.

The infrared light is emitted and received on the surface where the touch is made in the display device 10. That is, infrared light-emitting units 11 and 12 are provided on the upper side and the left side, and infrared light-receiving units 13 and 14 are provided on the lower side and the right side. If a touch is not made on the surface of the display device 10, the infrared light emitted from the infrared light-emitting units 11 and 12 is received by the infrared light-receiving units 13 and 14. If a touch 15 is made on the display device 10, a light 21 of infrared lights emitted from the upper infrared light-emitting unit 11 is not received by the lower infrared light-receiving unit 13 (see an area 31). As a result, the lower infrared light-receiving unit 13 recognizes the area 31, where the infrared light is not received, to transfer an X-coordinate value (of the area 31) to a touch function unit. In addition, a light 22 of infrared light emitted from the left infrared light-emitting unit 12 is not received by the right infrared light-receiving unit 14 (see an area 32). As a result, the right infrared light-receiving unit 14 recognizes the area 32, where the infrared light is not received, to transfer a Y-coordinate value (of the area 32) to the touch function unit. The touch function unit recognizes the X and Y coordinate values corresponding to the areas where the infrared light is not received, to thereby identify the touched area.

The touch recognition method using the external infrared sensors of FIG. 1 may be applied to large scale display devices (a TV set or a digital signage).

The configuration of FIG. 1 requires a separate touch recognition device (the infrared light-emitting units and the infrared light-receiving units) in order to recognize the touch coordinates, which causes an increase in a manufacturing cost. In addition, the volume of the touch device is a barrier to making the display device slim.

In the present specification, the description will be made of technology by which a touched area is recognized by identifying a change in the properties of a transistor when a touch is made in the display device to thereby provide a touch function of the display device without a separate device.

In the present disclosure, in order to identify a change in the properties of the transistor upon the receipt of a touch, the change of the transistor is recognized in each pixel, in predetermined pixels, or in a group of pixels to determine the provision of the touch. In the case of identifying the touch in each group, a touch detection speed may be increased. In addition, the noise resulting from another factor rather than the touch may be eliminated using an average value or an intermediate value of change values of a plurality of transistors in a single touch recognition area.

The change in the properties of the transistor may be detected based on changes in the threshold voltage (Vth) and the mobility of the transistor that drives a pixel in a corresponding area when a touch is made. The change of the threshold voltage and the mobility may be detected using a sensing function of the display device.

Figure 2:
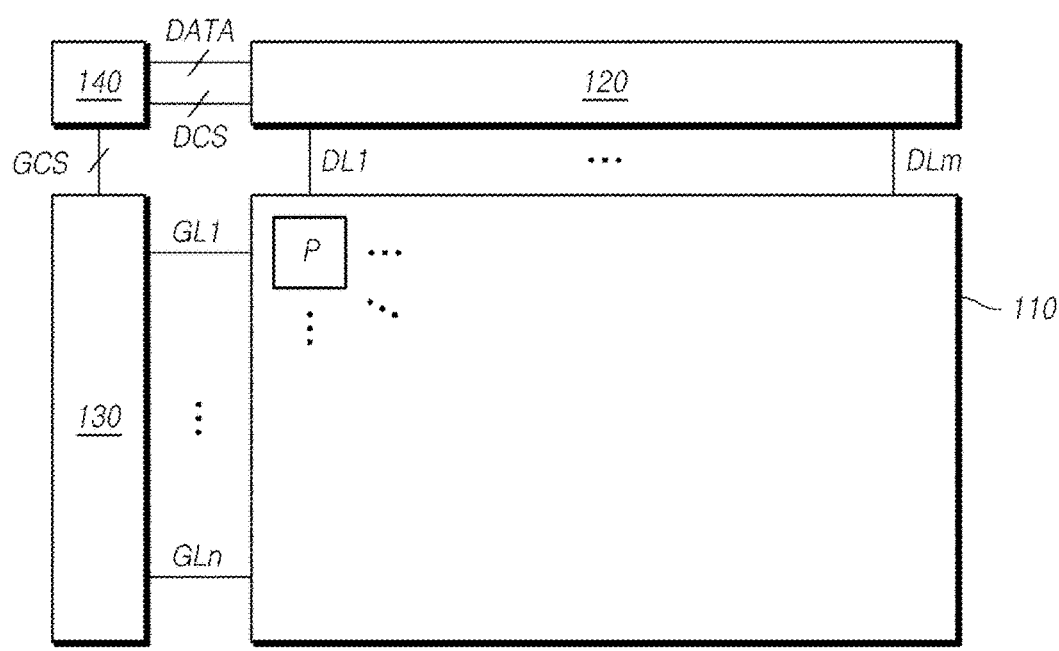
FIG. 2 illustrates a schematic system configuration of a display device 100 according to embodiments disclosed herein.

FIG. 2 illustrates a schematic system configuration of a display device 100 according to embodiments disclosed herein.

Referring to FIG. 2, the display device 100, according to embodiments, may include a display panel 110, on which m data lines DL1 to DLm (m is a natural number) and n gate lines GL1 to GLn (n is a natural number) are formed, a data driving unit 120 that drives the m data lines DL1 to DLm, a gate driving unit 130 that drives n gate lines GL1 to GLn in sequence, and a timing controller 140 that controls the data driving unit 120 and the gate driving unit 130.

Pixels may be formed at the intersections of the m data lines DL1 to DLm and the n gate lines GL1 to GLn on the display panel 110.

The timing controller 140 may start a scanning operation according to a timing implemented in each frame, and may convert image data input from an interface into a data signal suitable for the data driving unit 120 to output the converted image data. In addition, the timing controller 140 may control the driving of data at a proper time according to the scanning.

In order to control the data driving unit 120 and the gate driving unit 130, the timing controller 140 may output various control signals, such as data control signals (DCS), or gate control signals (GCS).

The gate driving unit 130 may supply voltage-on signals or voltage-off signals to the n gate lines GL1 to GLn to thereby drive the same in sequence, under the control of the timing controller 140.

The data driving unit 120 may pre-store the input image data (Data) in a memory (not shown). When a specific gate line is opened, the data driving unit 120 may convert the corresponding image data (Data) into an analog data voltage (Vdata) to be thereby supplied to the m data lines DL1 to DLm for driving the same, under the control of the timing controller 140.

The data driving unit 120 may include a plurality of data driver integrated circuits (ICs, referred to as a "source driver IC" as well). The plurality of data driver ICs may be connected to a bonding pad of the display panel 110 in a tape automated bonding (TAB) type or a chip-on-glass (COG) type, or may be directly mounted on the display panel 110. Alternatively, the data driver ICs may be integrated in the display panel 110 in some cases.

The gate driving unit 130 may be provided on one side of the display panel 110 as shown in FIG. 1, or may be on both sides thereof in some cases, according to a driving type.

In addition, the gate driving unit 130 may include a plurality of gate driver ICs. The plurality of gate driver ICs may be connected to a bonding pad of the display panel 110 in a tape automated bonding (TAB) type or a chip-on-glass (COG) type, or may be directly mounted on the display panel 110 in a gate-in-panel (GIP) type. Alternatively, the gate driver ICs may be integrated on the display panel 110 in some cases.

The timing controller 140 mentioned above may be provided in a source board (referred to as a source printed circuit board (SPCB) as well), which is connected with the driving IC, and a control board (referred to as a control printed circuit board (CPCB) as well), which is connected through a connector.

One or more circuit elements, such as transistors, may be formed in each pixel "P" of the display panel 110.

For example, in the case of an organic light emitting display panel 110, circuit elements, such as one organic light emitting diode, two or more transistors, and one or more capacitors, may be formed in each pixel "P".

Meanwhile, as the driving time of the display panel 110 increases, degradation of the display panel 110 may occur to thereby worsen the uniformity of the display properties of the display panel 110.

Such degradation of the display panel 110 mainly stems from a change and a shift in characteristics of the circuit elements in the pixel "P" of the display panel 110, and a difference in eigenvalues between the circuit elements in the pixel "P" of the display panel 110.

For example, in the case of a transistor as the circuit element, eigenvalues of the circuit element may include the threshold voltage and the mobility of the transistor. In the case of an organic light emitting diode as the circuit element, eigenvalues of the circuit element may include the threshold voltage of the organic light emitting diode.

Therefore, the display device 100, according to embodiments disclosed herein, may provide a function of sensing eigenvalues of the circuit elements (e.g., the transistor, the organic light emitting diode, or the like) formed in the pixel "P" of the display panel 110 by sensing the display panel 110, and a function of compensating a change, a shift, and a difference in the eigenvalues of the circuit elements. In addition to the sensing function, the display panel 100 may further provide a touch function by which a touch is recognized through a change in sensed values.

More specifically, the display panel 110 may be divided into a plurality of touch recognition areas, and the timing controller 140 may control a sensing mode and a display mode to detect a touch in each touch recognition area in the sensing mode. Accordingly, without a separate circuit configuration, the timing controller can detect the touch in the sensing mode to thereby quickly calculate the touched position.

Thus, in the display device 100 according to embodiments disclosed herein, the display panel 110 may be operated in the display mode and the sensing mode.

The display panel 110 of the display device 100, according to embodiments disclosed herein, may perform a sensing operation according to a power-off signal to store sensed data in a memory, and afterwards, when the device is turned on, the display panel 110 may perform a compensation operation (a data compensation process) using the stored sensed data. That is, when the display device 100 is turned off, the driving mode is changed into the sensing mode to perform the sensing.

In some cases, the display panel 110 of the display device 100, according to embodiments disclosed herein, may perform the sensing operation in real time while the device is turned on. That is, the driving mode may be changed into the sensing mode according to a predetermined timing to perform the sensing operation while the device is turned on. A sensing timing thereof is illustrated as an example in FIG. 3.

Figure 3:
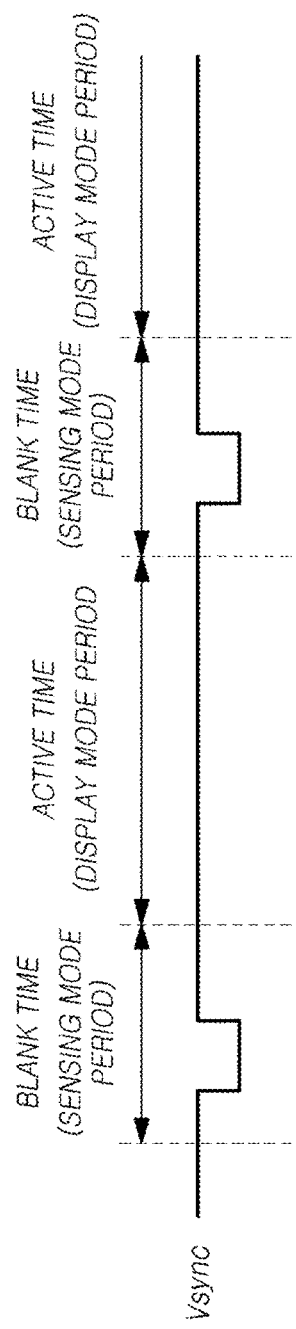
FIG. 3 is a timing diagram showing sensing mode periods and display mode periods of a display device 100 according to embodiments disclosed herein.

FIG. 3 is a timing diagram showing sensing mode periods and display mode periods of a display device 100 according to embodiments disclosed herein.

Referring to FIG. 3, in the case where a real-time sensing function is applied while the device is turned on, the display panel 110 of the display device 100, according to embodiments disclosed herein, may operate in the display mode and the sensing mode alternately. That is, the display panel 110 may operate in a manner of time-division between the display mode and the sensing mode.

For example, one frame period may be divided into a display mode period and a sensing mode period.

More specifically, one frame period may be divided into an active time section and a blank time section on the basis of a vertical synchronization signal (Vsync). The display panel 110 may operate as the display mode in the active time section, and may operate as the sensing mode in the blank time section, respectively.

The timing controller of the display panel 110 may sense the properties of the transistor in the sensing mode corresponding to the blank time section, and if the change value of the transistor, as a result of the sensing, exceeds a critical value, it may be determined that the touch has been made.

More specifically, a touch panel is provided by which, when a touch is made on the organic light emitting display panel, the change of the transistor depending on a change in the temperature, e.g., a change in the mobility, is detected to thereby obtain information on the touch position. In the operation of the touch panel implemented, when the display panel is touched by fingers or touch pens, the threshold voltage (Vth) and the mobility of the thin film transistor of the display panel may be changed due to the change in the temperature, and then the voltage changed according to the changes may be sensed to recognize the touch. In addition, voltage changes of all pixels in the active area of the panel are sensed to be compared with previous data, and if a difference between the sensed data and the previous data exceeds a critical value, the touch may be recognized to thereby transmit touch position information or touch indication information on the touched area to a system. According to this, external compensation may be made in the course of the sensing, and the changed properties of the transistors may be compared during the sensing without a separate touch panel to recognize the touched position. Therefore, the display panel can operate more accurately, and it is favourable for the manufacturing process or the manufacturing cost.

Figure 4:
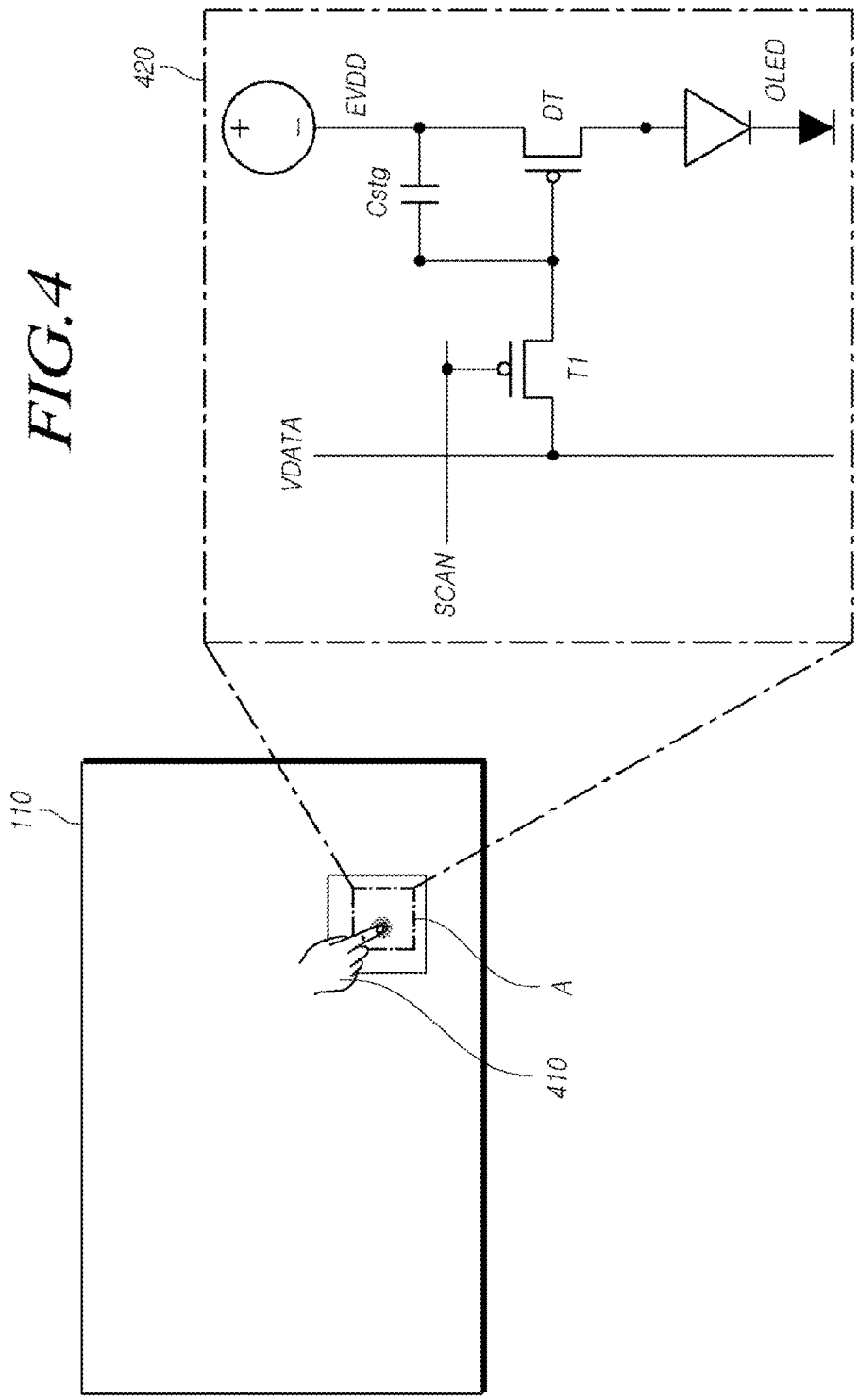
FIG. 4 illustrates an example of detecting a touch on a display panel according to an embodiment.

FIG. 4 illustrates an example of detecting a touch on a display panel according to an embodiment disclosed herein.

A touch 410 is made in an area "A" of the display panel 110. The threshold voltage and the mobility of at least one driving transistor in the area "A" may be changed. For example, as the temperature increases by 10 degrees in a specific display panel, the threshold voltage may increase by −25 mV to −62 mV. In addition, the mobility may increase by 3.8% to 4.5%. The changes of the threshold voltage and the mobility may vary with display panels, and the present disclosure is not limited thereto.

Diagram 420 shows a configuration of a driving transistor (DT) and a switching transistor (T1), which are connected with a single pixel in FIG. 2. When the display panel 110 is touched, the properties of the driving transistor (DT) in diagram 420 may be changed. The detection of the change as a touch in the sensing mode will be described with reference to FIG. 5.

Figure 5:
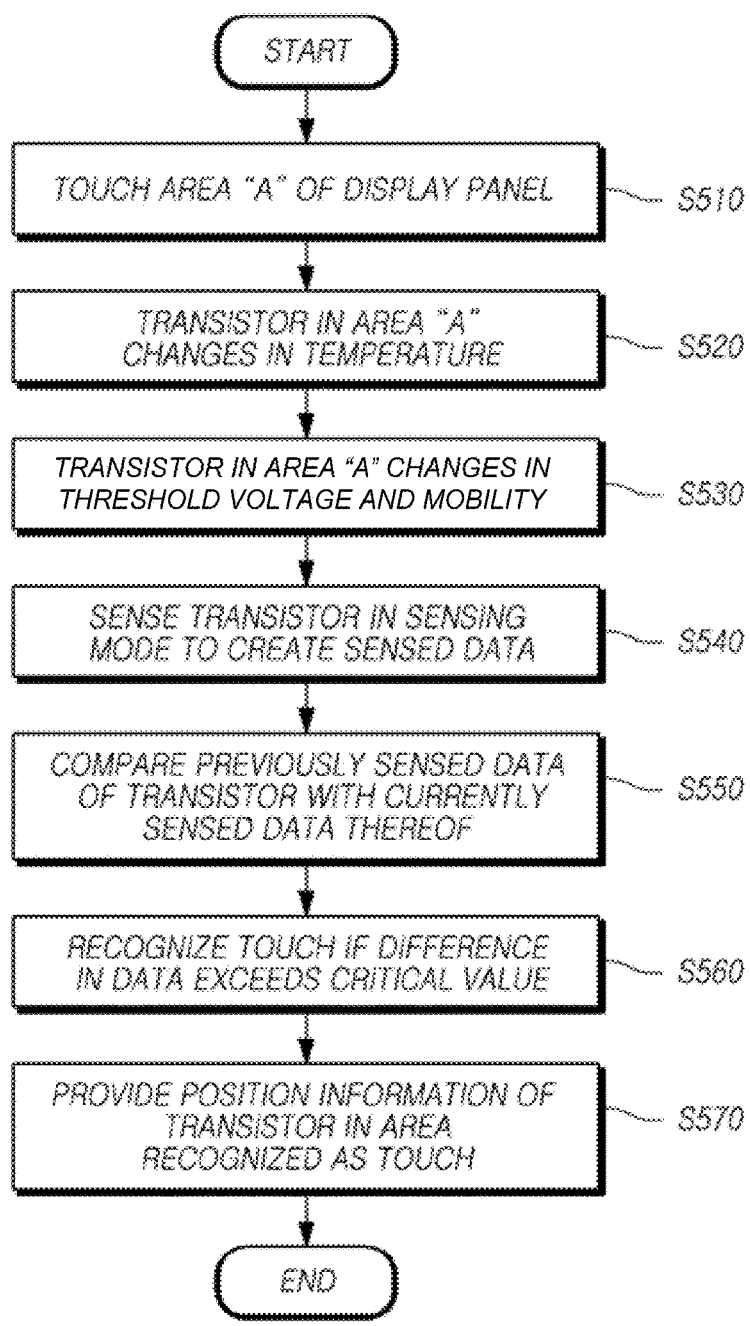
FIG. 5 is a flowchart illustrating the operation according to a touch on a pixel in the display panel according to an embodiment.

FIG. 5 is a flowchart illustrating the operation according to a touch on the pixel in the display panel according to an embodiment disclosed herein.

A touch is made in the area "A" of the display panel (S510). The touch may be made by means that emit an infrared light, more specifically, by hands, touch pens emitting heat, infrared remote controllers, or the like. The temperature of the transistor in the area "A" may be changed due to the touch (S520). The change in the temperature will be described in detail with reference to FIG. 5. As a result of the change in the temperature of the transistor, the threshold voltage and the mobility of the transistor in the area "A" may be changed (S530). The transistor may be sensed in the sensing mode to create sensed data (S540). At this time, sensed data of the transistor in the area "A", which reflects the threshold voltage and the mobility changed due to the touch, may be created. The sensed data and previously sensed data of the transistor may be compared with each other (S550). As a result of the comparison, if a difference value with respect to the previously sensed data exceeds a critical value, the corresponding transistor may be determined that the temperature thereof has been changed due to the touch from the outside. The position of the transistor overlaps area "A". Accordingly, the timing controller may recognize that the touch has been made in the area where the temperature of the transistor is changed (S560) such that the difference in data exceeds a critical value. In addition, the position information of the transistor that is recognized as the touch may be provided to an external system (S570).

In the operation of FIG. 5, if a difference value between the currently sensed data and the previously sensed data exceeds a critical value in a specific transistor, it may be determined that a touch has been made in the corresponding transistor. Meanwhile, a difference in the data exceeding the critical value may stem from another cause rather than the touch of the transistor. Accordingly, the positions of the transistors, where differences in the data exceed the critical value, are identified, and if the number of the transistors with respect to the differences exceeding the critical value is more than a predetermined value, the touch may be recognized.

In addition, it is not necessary to identify the occurrence of the touch in all of the pixels, and the occurrence of the touch may be identified in some of the pixels or in a group of pixels. This will be described later.

Figure 6:
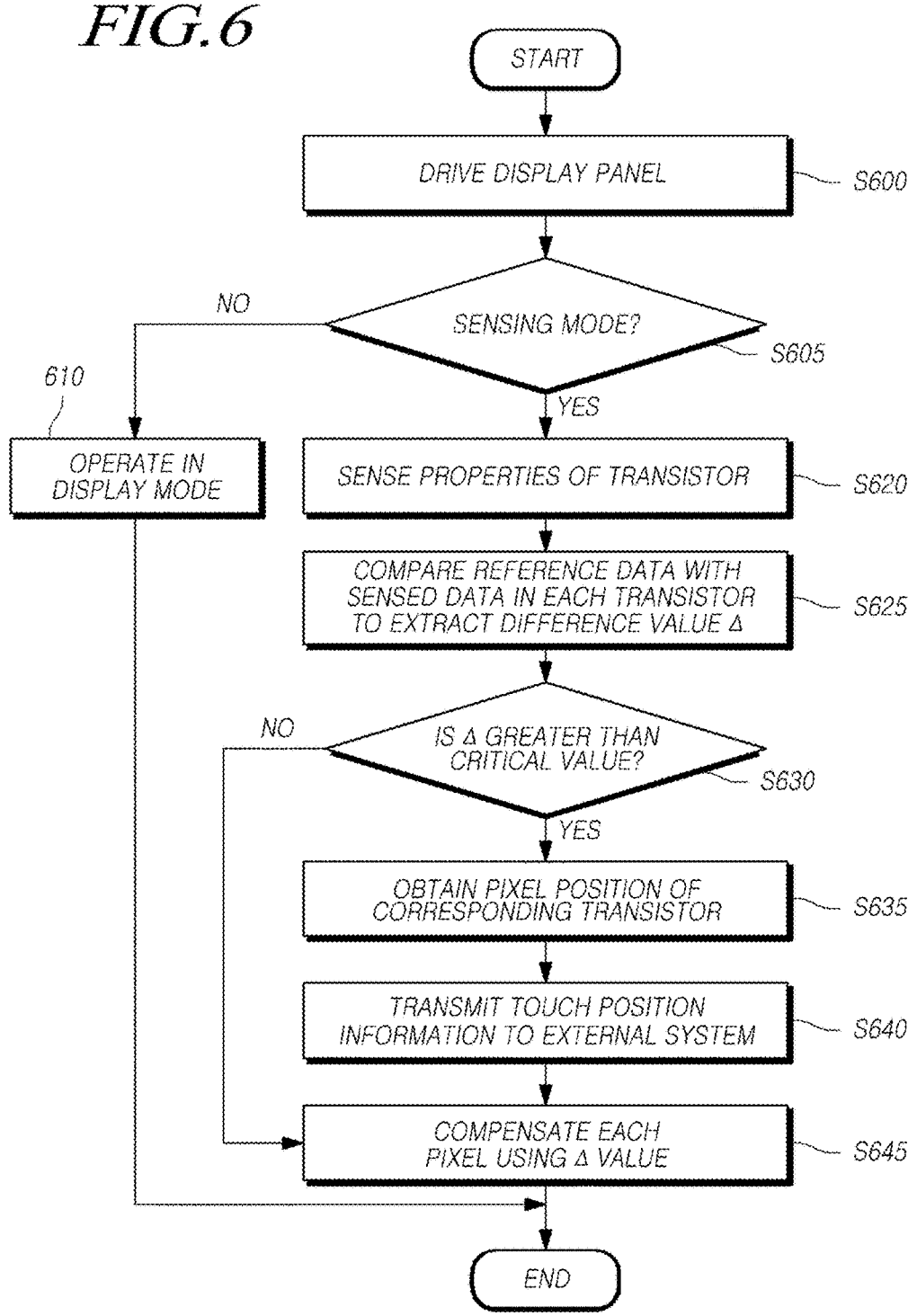
FIG. 6 is a flowchart illustrating the operation of executing a compensation function and a touch function in a sensing mode in a panel according to an embodiment.

FIG. 6 is a flowchart illustrating the operation of executing a compensation function and a touch function in a sensing mode in a panel according to an embodiment disclosed herein. FIG. 6 shows the operation of the display panel in the sensing mode period and the display mode period in FIG. 3. When the display panel is operated (S600), it is determined whether the operation is performed in the sensing mode or the display mode in operation S605. In the case of the display mode, the operation is performed in the display mode in which images may be output in the active time (S610). In the case of the sensing mode, the properties of the transistor may be sensed in the blank time (S620). As a result of the sensing, sensed data may be extracted for each transistor, and the sensed data may be compared with reference data, which is previously configured for each transistor (pixel), to thereby extract a difference value Δ (S625). It is determined whether or not the difference value Δ is greater than a critical value (S630). This can be performed as follows.

When "Ref_Data" denotes the reference data previously configured, and "Sense-Data" denotes the sensed data for each transistor, the difference value may be obtained from Equation 1.

$$\Delta = \text{Sense\_Data} - \text{Ref\_Data} \quad \text{Equation 1}$$

Meanwhile, the critical values that can be regarded as a touch may be divided into two values, i.e., "Touch_th_gt" and "Touch_th_lt," wherein "Touch_th_gt" denotes a positive critical value and "Touch_th_lt" denotes a negative critical value. The absolute value of "Touch_th_gt" does not need to be the same as that of "Touch_th_lt," and the sensing may be performed in various ways. The critical values and the difference value may be compared according to a pseudo code as Equation 2 below.

if (Δ>Touch_*th_gt*) then Touch_Sensed=TRUE;

else if (Δ<Touch_*th_lt*) then Touch_Sensed=TRUE;

else Touch_Sensed=FALSE;     Equation 2

Pixel position information of the transistor, in which the touch has been sensed, may be extracted (S635), and then, the timing controller may transmit the touch position information to the external system (S640). Next, a compensation operation suitable for the configuration of the transistor may be performed. That is, the compensation may be made in each pixel using the difference value Δ (S645). Referring to the compensation operation in detail, a difference between the sensed data and the reference data may be compared to create a new value of "α." This may be obtained using a pseudo code suggested by Equation 1 above and Equation 3 below.

if (Sense_Data>Ref_Data) then α=α−Δ else if (Sense_Data<Ref_Data) then α=α+Δ else if (Sense_Data=Ref_Data) then α=α     Equation 3

The changed properties of the display panel may be compensated by reflecting the value of "α" calculated for each transistor to the output data.

Figure 7:
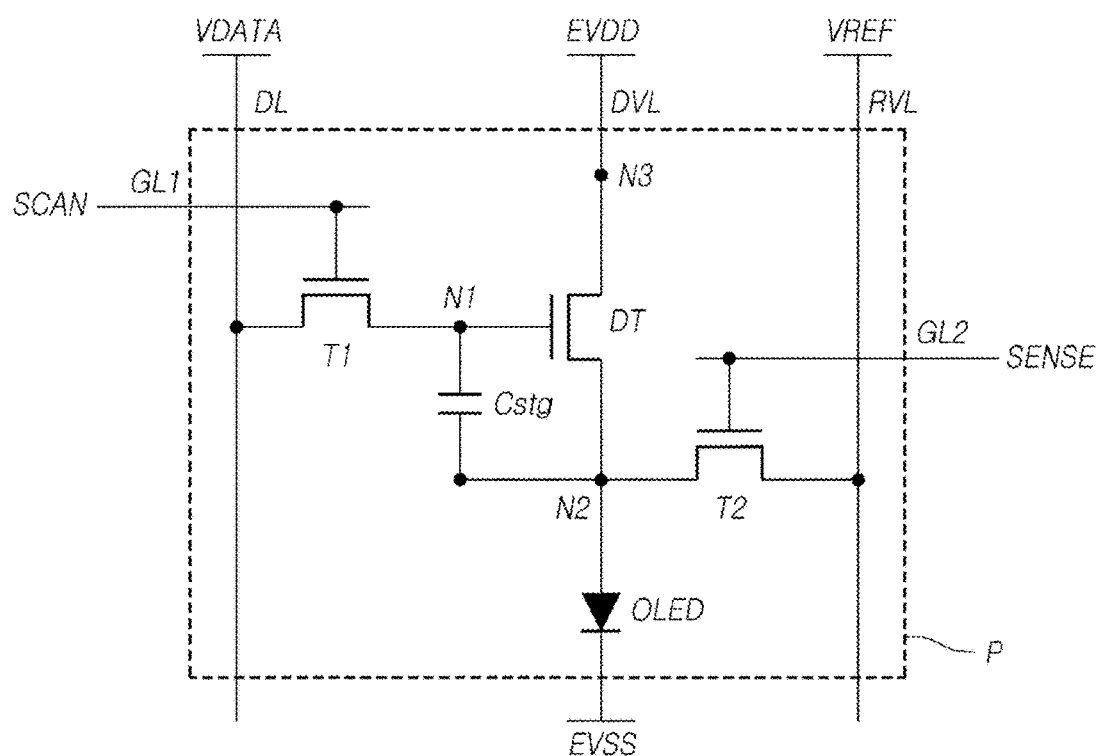
FIG. 7 illustrates a configuration of a transistor that detects a touch according to an embodiment.

FIG. 7 illustrates a configuration of a transistor that detects a touch according to an embodiment disclosed herein.

FIG. 7 shows an equivalent circuit diagram of the pixel "P" in the display panel 110 in the case of an organic light emitting display device as the display device 100.

Referring to FIG. 7, in the case of the organic light emitting display device, according to embodiments disclosed herein, the pixel "P" formed in the display panel 110 may be a pixel of 3T (transistors)-1C (capacitor), which includes three transistors (DT, T1 and T2), and one storage capacitor (Cstg) as well as an organic light emitting diode (OLED).

More specifically, referring to FIG. 7, the pixel "P" may include: an organic light emitting diode (OLED); a driving transistor (DT) that is connected between a node (N3), which is applied with a driving voltage (EVDD) through a driving voltage line (DVL), and the organic light emitting diode (OLED); the first transistor (T1) that is connected between a data line (DL) for supplying a data voltage (Vdata) and the first node (N1) (e.g., a gate node) of the driving transistor (DT), and that is controlled by the first scan signal (SCAN) supplied through the first gate line (GL1); the second transistor (T2) that is connected between a node, to which the reference voltage (Vref) is supplied through a reference voltage line (RVL), and the second node (N2) (e.g., a source node or a drain node) of the driving transistor (DT), and that is controlled by the second scan signal (SENSE) supplied through the second gate line (GL2); and a storage capacitor (Cstg) that is connected between the first node (N1) and the second node (N2) of the driving transistor (DT).

The first transistor (T1) may be turned on and off by the first scan signal (SCAN), and may apply the data voltage (Vdata) supplied through the data line (DL) to the gate node (N1) of the driving transistor (DT) for driving the organic light emitting diode (OLED).

That is, the first transistor (T1) is a switching transistor that switches the voltage applied to the gate node (N1) of the driving transistor (DT) to control the same.

In addition, the second transistor (T2) may apply a constant voltage (Vref) necessary for the display operation and the sensing operation to the second node (N2) of the driving transistor (DT).

In addition, the second transistor (T2) may be turned on for a specific amount of time in the sensing mode period to allow the voltage of the second node (N2) (e.g., a source node or a drain node) of the driving transistor (DT) to be sensed through the reference voltage line (RVL).

In this operation, when a touch is made with respect to the pixel, the properties of the driving transistor (DT) may be changed to be sensed by the second transistor (T2).

Here, the reference voltage line (RVL) is applied with the reference voltage (Vref), and it is also a sensing line through which the voltage of the second node (N2)(e.g., a source node or a drain node) of the driving transistor (DT) is sensed.

Figure 8A:
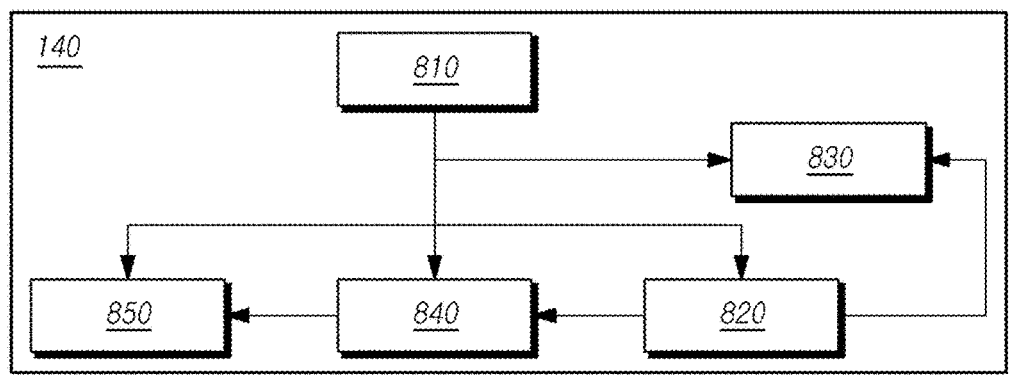
FIG. 8A illustrates a configuration of a timing controller according to an embodiment.

FIG. 8A illustrates a configuration of the timing controller 140 according to an embodiment disclosed herein.

The timing controller 140 may include a mode controller 810, a sensing controller 820, a touch controller 830, a compensation unit 840, and a panel driving unit 850, which may be configured as separate circuits or may be configured integrally as a single circuit. Therefore, some elements may operate as a combined element, and one element may be divided into sub-elements to be operated.

The mode controller 810 may configure the display panel as one of the sensing mode or the display mode. More specifically, the mode controller 810 may select one of the sensing mode or the display mode as a driving mode of the display panel 110. At this time, the selection of the driving mode may be based on the vertical synchronization signal (Vsync).

The sensing controller 820 may control the sensing according to the control of the mode controller 810, and may obtain the sensed data. That is, the sensing controller 820 may make a control to perform the sensing operation with respect to the display panel 110 according to a sensing driving frequency in the sensing mode period to thereby obtain the sensed data.

The touch controller 830 may compare change values of the sensed data of representative transistors corresponding to K touch recognition areas of the display panel with a touch critical range. The comparison operation has already been described in FIGS. 5 and 6, and the configuration of the touch recognition area and the representative transistor will be described with reference to FIGS. 9 to 11. As a result of the comparison, if the change value of the sensed data of the transistor is within the critical range, it may be determined that a touch has been made in the corresponding touch recognition area, and the touch may be identified using the sensing mode.

The compensation unit 840 may create compensation data on the basis of the data sensed by the sensing controller 820.

The panel driving unit 850 may output the compensation data to the data driving unit. More specifically, the panel driving unit 850 may control the driving of the display panel 110 on the basis of the compensation data created in the compensation unit 840 in the display mode period.

That is, the panel driving unit 850 may output the compensation data to the data driving unit 120, and the data driving unit 120 may convert the compensation data into a data voltage to output the same to the data line. Accordingly, the eigenvalues of the circuit element may be compensated in the corresponding pixel.

By using the configuration of FIG. 8A, the timing controller 140 may detect a touch in the display panel without an additional circuit of the display panel.

Figure 8B:
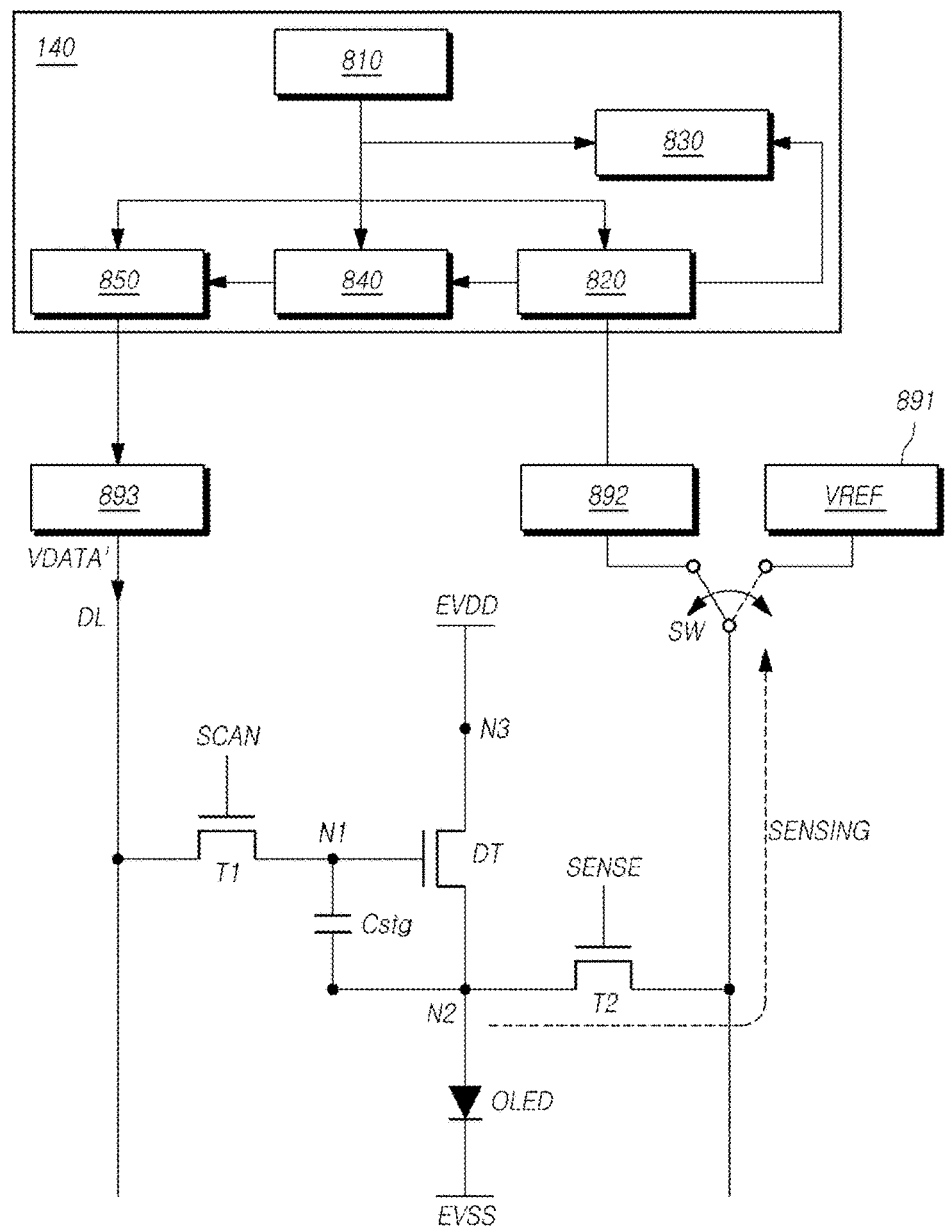
FIG. 8B illustrates the operation in which a timing controller identifies a touch in a circuit of a display panel according to an embodiment.

FIG. 8B illustrates the operation in which a timing controller of FIG. 8A recognizes a touch in a circuit of the display panel according to an embodiment disclosed herein.

Referring to FIG. 8B, a switching element (SW), which switches between a reference voltage supply terminal 891 and the sensing unit (892), may be connected to one end of the reference voltage line (RVL).

For example, the sensing unit 892 may be an analog-digital converter (ADC) included in the data driver IC of the data driving unit 120.

FIG. 8B is a diagram for describing a sensing operation and a compensation operation of the display panel 100 in the pixel of the configuration of FIG. 7, according to embodiments disclosed herein.

Referring to FIG. 8B, when the mode controller 810 changes the driving mode from the display mode to the sensing mode, the sensing controller 820 may control the switching element (SW) such that the sensing unit 892 in the data driver IC senses the voltage (the sensed voltage) of the second node (N2) of the driving transistor (DT).

At this time, the sensing unit 892 in the data driver IC may convert the voltage (the sensed voltage) of the second node (N2) of the driving transistor (DT) into an analog value to thereby transfer the same as the sensed data to the sensing controller 893 of the timing controller 140.

Meanwhile, the touch controller 830 may compare the sensed data of the representative transistor in the touch recognition area with the touch critical range corresponding to a touch, using information controlled in the sensing controller 820. For example, as describe in FIG. 6 above, if a difference value is within the critical range according to Equation 1 and Equation 2, that is, if a difference between the sensed data and the previous data is big enough to recognize the touch, it is determined that the touch has been made with respect to the representative transistor, and the touch controller 830 may provide position information, e.g., X/Y-coordinates, of the touch recognition area corresponding to the representative transistor.

Referring more specifically to the sensing operation, an initializing operation, in which the data voltage (Vdata) and the reference voltage (Vref) are applied to the first node (N1) and the second node (N2) of the driving transistor (DT) in the corresponding pixel, respectively, to initialize the same, and a sensing operation, in which the voltage of the second node (N2) of the driving transistor (DT) is boosted by floating the second node (N2) of the driving transistor (DT), and when the voltage of the second node (N2) of the driving transistor (DT) is saturated close to the voltage (Vdata) of the first node (N1) of the driving transistor (DT), the voltage of the second node (N2) of the driving transistor (DT) is sensed as a sensed voltage (Vsen) at that time, may be performed before the voltage (the sensed voltage) of the second node (N2) of the driving transistor (DT) is sensed.

Here, the voltage of the second node (N2) of the driving transistor (DT) may be boosted to become saturated when a difference between the voltage of the second node (N2) and the voltage (Vdata) of the first node (N1) of the driving transistor (DT) reaches the threshold voltage (Vth) of the driving transistor (DT). Accordingly, at the time of saturation, the sensed voltage of the second node (N2) of the driving transistor (DT) corresponds to the value of "Vdata−

Vth", and thus if the Vdata is known, the threshold voltage (Vth) of the driving transistor (DT) may be sensed.

After the voltage of the second node (N2) of the driving transistor (DT) is saturated, the threshold voltage (Vth) of the driving transistor (DT) is to be sensed.

Meanwhile, the increase in the voltage (the voltage change) of the second node (N2) of the driving transistor (DT) is in proportion to the mobility of the driving transistor (DT). Therefore, the mobility of the driving transistor (DT) may be sensed on the basis of the increase in the voltage (the voltage change) of the second node (N2) of the driving transistor (DT).

At this time, when the driving transistor (DT) is touched with a finger, the voltage and the mobility may be changed due to the increase in the temperature from the outside of the driving transistor, and the changes thereof may be sensed in the sensing mode. If the change in the sensed data exceeds a critical value, the touch controller 830 may determine that the touch has been made with respect to the corresponding transistor. The obtained information may be transmitted to the external system of the timing controller 140.

In FIG. 8B, the sensing unit 892 in the data driver IC may perform the sensing operation according to the control of the sensing controller 820 of the timing controller 140 as described above, and may transfer the resulted sensed data to the sensing controller 820 of the timing controller 140.

As described above, after the sensing operation by the sensing unit 892 in the data driver IC is completed and the sensing controller 820 of the timing controller 140 receives the sensed data, the mode controller 810 may convert the sensing mode into the display mode, and the touch controller 830 may perform an operation to identify the touch from the sensed data.

The compensation unit 840 of the timing controller 140 may perform a compensation operation using the sensed data transferred to the sensing controller 820 to thereby create compensation data. The panel driving unit 850 of the timing controller 140 may output the compensation data to the data driver IC during the operation of the display.

Accordingly, the data driver IC may convert the compensation data (Data') into a data voltage (Vdata') through a digital-analog converter (DAC) to output the same to a corresponding data line (DL).

Sub-pixel areas may be comprised of three sub-pixels of RGB (Red/Green/Blue), or four sub-pixels of RWGB (Red/White/Green/Blue). A single pixel may be comprised of two or more sub-pixel areas, and a pixel area refers to an area including all of the sub-pixel areas.

Normally, a touch area on the display panel is quite large compared to the pixel. Therefore, the transistors of all pixels need not be identified for the touch. Instead, in order to increase the processing speed, the pixel areas or the sub-pixel areas may be grouped into a touch recognition area, and a change value of the sensed data with respect to one or more representative transistors in the touch recognition area may be compared to detect the touch. According to an embodiment disclosed herein, in order to implement a precise touch, each sub-pixel area may be configured as the touch recognition area, and the sensed data of the driving transistors in each sub-pixel area may be compared. Alternatively, in consideration of a rapid process of touch recognition and the efficiency thereof, only the representative transistors of the pixel areas in odd number rows or even number rows along the X-axis or the Y-axis may be identified for the touch. According to another embodiment disclosed herein, a specific number of sub-pixel areas or pixel areas may be grouped into the touch recognition area, and the driving transistor in the pixel area or the sub-pixel area may be configured as the representative transistor for identifying the touch in the touch recognition area. One or more representative transistors may be configured in the touch recognition area to raise the touch recognition precision. For example, in the case where two representative transistors are configured in the touch recognition area, it may be determined that the touch has been made in the corresponding touch recognition area only when changes corresponding to the touch occur in both of the two representative transistors. In addition, in order to improve the touch recognition precision, in the case where a touch is detected in the touch recognition area, it may be recognized as a touch only when the touch is detected in the adjacent touch recognition area as well to distinguish the change of the transistor due to the touch from the change generated in the transistor itself.

Figure 10:
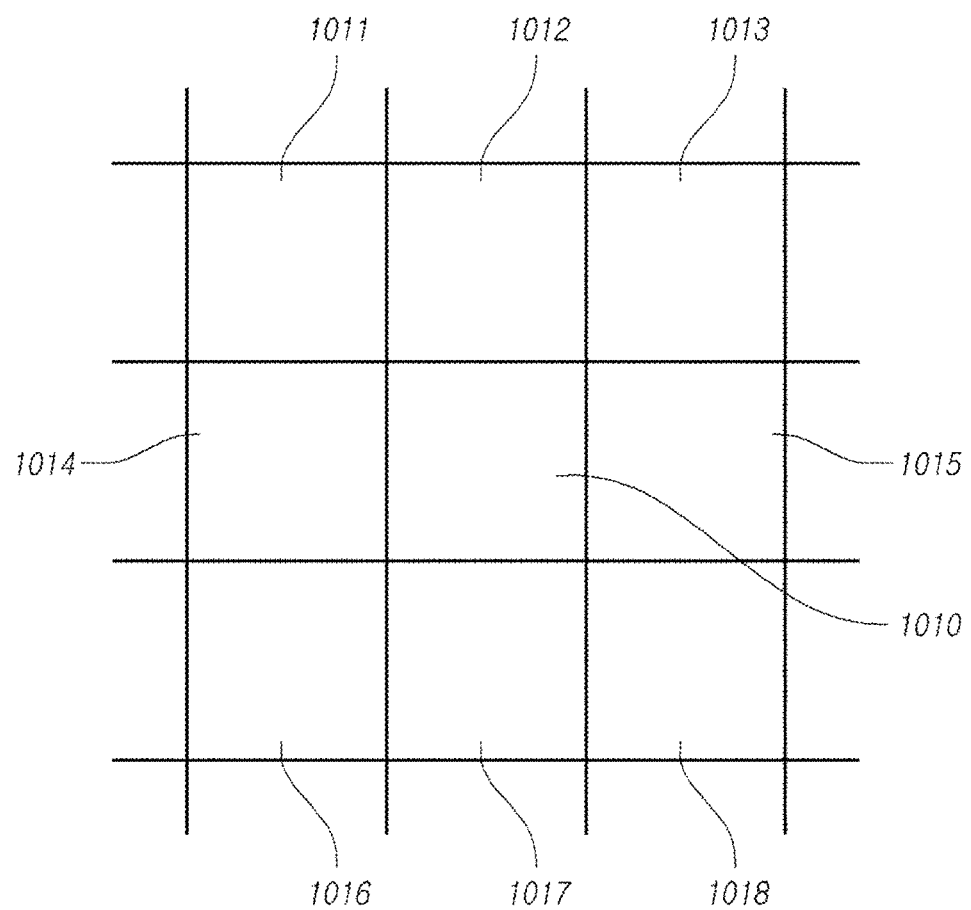
Figure 11:
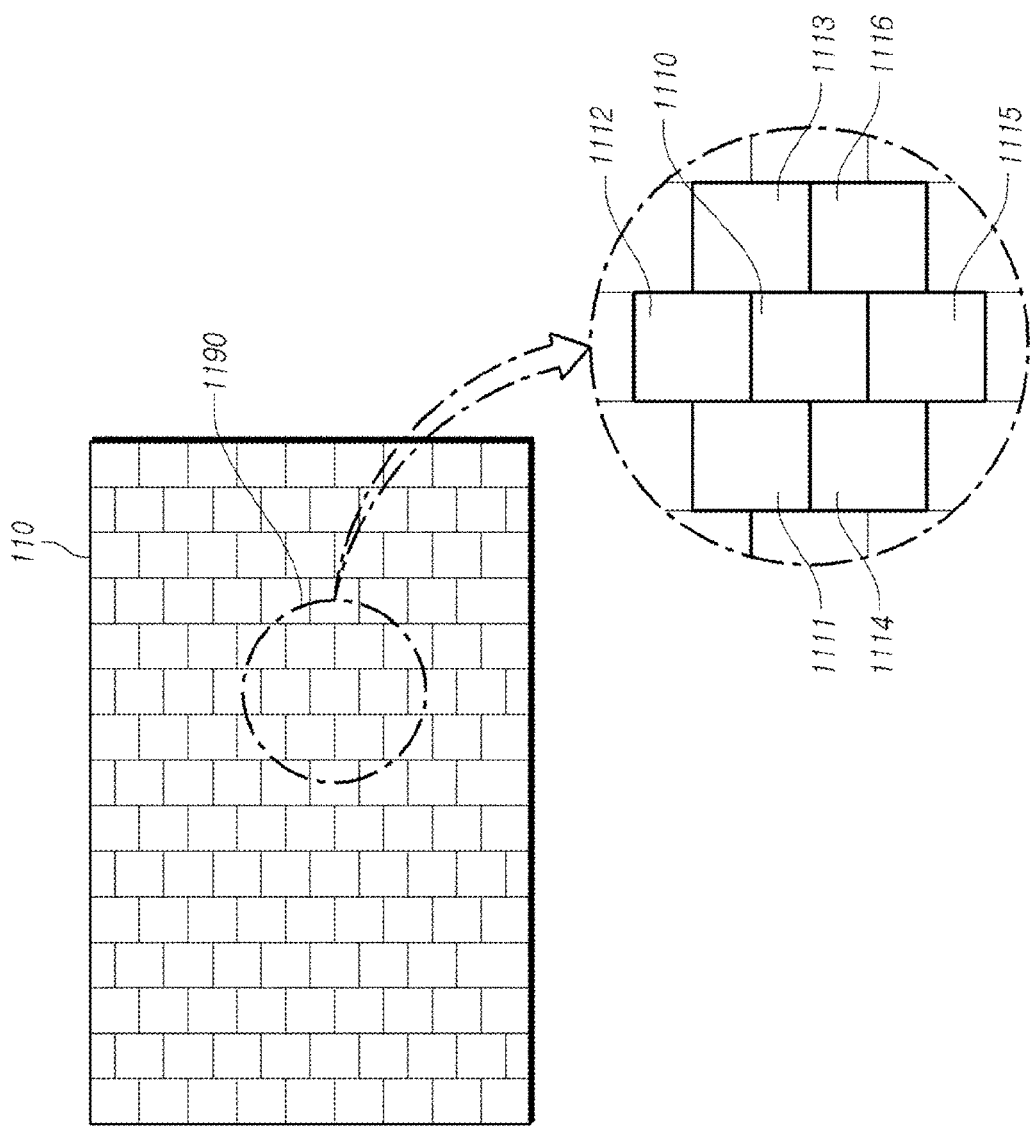
Figure 12:
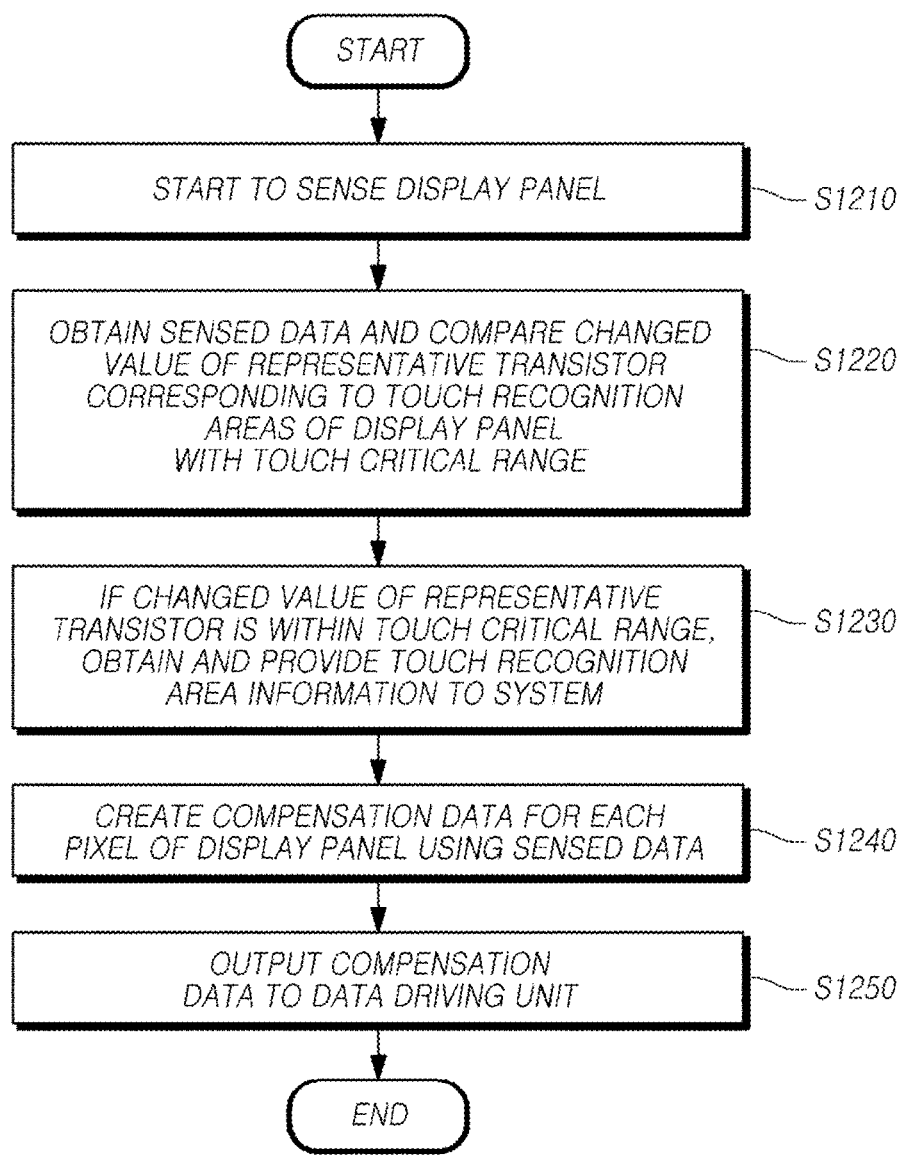
FIG. 12 illustrates the operation of the touch recognition area according to an embodiment.

FIGS. 9 to 11 illustrate a configuration of the touch recognition area and FIG. 12 illustrates the operation of the touch recognition area according to an embodiment disclosed herein.

FIGS. 9 to 11 show embodiments in which a plurality of touch recognition areas is configured in the display panel. The touch recognition area may correspond to a single pixel area including the sub-pixel areas of RGB or RWGB. In this case, the representative transistor may be a driving transistor that drives one of the sub-pixel areas. When the touch recognition area corresponds to a single pixel area, the touch may be recognized in each pixel to thereby enhance the touch recognition precision.

According to another embodiment, a single touch recognition area may correspond to a plurality of pixel areas. In this case, the representative transistor may be a driving transistor that is selected from one or more of the plurality of pixel areas. In the case where two representative transistors are selected from a single touch recognition area, the accuracy of touching in the touch recognition area can be enhanced. Here, the representative transistor may be selected from the driving transistors in the sub-pixel areas of each pixel area. According to another embodiment, each of the driving transistors in two sub-pixel areas of a single pixel may be configured as the representative transistor. The touch recognition area may be configured as one or more pixel areas, or may be configured as one or more sub-pixel areas, and it may be configured in various ways. In addition, one or more representative transistors may be configured in a single touch recognition area, and it may be configured in various ways as well.

FIG. 9 shows the display panel that is partitioned in a lattice form, and each rectangle refers to a touch recognition area. A single touch recognition area may include one or more sub-pixel areas, or one or more pixel areas, and it may be determined in various ways according to the touch recognition precision how many pixel areas or sub-pixel areas are to be grouped into the touch recognition area. Referring to the touch recognition area 910 of FIG. 9 in detail, a single representative transistor 915a may be configured in the touch recognition area 910a, and the representative transistor may be a driving transistor in one of a plurality of pixel areas or a plurality of sub-pixel areas.

Alternatively, two representative transistors 925a and 925b may be configured in the touch recognition area 910b, and the representative transistors may be driving transistors in two of a plurality of pixel areas or a plurality of sub-pixel areas of the touch recognition area 910b.

In the case of two representative transistors, it may be determined that the touch has been made in the corresponding touch recognition area only when an increase in the temperature due to the touch occurs in both of the two representative transistors. To this end, the touch controller 830 may store information on the representative transistors of the touch recognition area, and may identify the sensed data of the representative transistors. In addition, according to another embodiment, the representative transistors may be identified alternately in every sensing mode. For example, in the case of two representative transistors in the touch recognition area 910*b*, the touch may be identified through the sensed data of the representative transistor 925*a* in the Pth sensing mode, and then may be identified through the sensed data of the representative transistor 925*b* in the (P+1)th sensing mode.

Meanwhile, the touch in the touch recognition area may be detected on the basis of an average of the change values of the representative transistors. For example, in the case of M representative transistors in the touch recognition area, the change values created in the M representative transistors are obtained, and then an average value, or an intermediate value, of the change values are calculated to thereby identify the touch in the touch recognition area. That is, when a plurality of representative transistors is configured in a single touch recognition area, the touch recognition precision can be enhanced using the change value of each representative transistor.

The touch controller 830, if the change value of the data sensed in the representative transistor of the touch recognition area is within the touch critical range, may extract position information or identification information on the touch recognition area. At this time, the position information on the touch recognition area, where the touch has been recognized, may be extracted as X/Y-coordinate values, or the identification information on the touch recognition area, where the touch has been recognized, may be extracted.

This may improve the precision and the accuracy of touch recognition in the case where a single touch recognition area encompasses a plurality of pixel/sub-pixel areas.

Meanwhile, in order to enhance the touch recognition precision in the touch recognition area, the occurrence of a touch in the adjacent touch recognition area may be identified.

FIG. 10 shows an embodiment in which the touch recognition area is configured in a lattice form as FIG. 9 above. Here, if a change value of a representative transistor in a single touch recognition area is within the touch critical range, a change value of a representative transistor in the adjacent touch recognition area may be identified as well for verification.

FIG. 10 shows some of the touch recognition areas in FIG. 9. The first touch recognition area 1010 abuts eight touch recognition areas 1011, 1012, 1013, 1014, 1015, 1016, 1017 and 1018. In the case where the size of the touch recognition area is less than the size of a finger or an infrared touch pen, the touch is hardly made in a single touch recognition area because the finger or the infrared touch pen touches over several touch recognition areas. Therefore, even though the touch is identified in the first touch recognition area 1110, if no touch is detected in the adjacent touch recognition areas 1011, 1012, 1013, 1014, 1015, 1016, 1017 and 1018, it may be determined that the touch has not been made in the first touch recognition area 1010 to thereby raise the touch recognition precision. Accordingly, the touch controller 830 may identify a specific touch recognition area, and the touch recognition areas adjacent thereto.

FIG. 11 illustrates a configuration of a touch recognition area according to another embodiment disclosed herein. Unlike the lattice form in FIG. 9, FIG. 11 shows a configuration in the form of a honeycomb. The representative transistor of each touch recognition area may be configured as the representative transistor 910*a* or 910*b* of FIG. 9.

Referring to the enlarged diagram of a portion 1190 in FIG. 11, a single touch recognition area 1110 abuts six touch recognition areas 1111, 1112, 1113, 1114, 1115 and 1116. When the touch is identified in the first touch recognition area 1110, it may be identified whether or not the touch is made in the six touch recognition areas 1111, 1112, 1113, 1114, 1115 and 1116 in order to raise the touch recognition precision.

As a result of the identification from the sensed data, if it is identified that the touch has been made in any one of the adjacent touch recognition areas 1111, 1112, 1113, 1114, 1115 and 1116, the touch controller 830 may surely determine that the touch has been made in the first touch recognition area 1110 to thereby extract position information of the first touch recognition area 1110.

As described in FIGS. 10 and 11, the touch in the adjacent touch recognition areas may be identified in order to enhance the accuracy of touch recognition. For example, the touch controller 830 may identify that the touch has been made in the first touch recognition area, and when the touch has occurred in the second touch recognition area adjacent to the first touch recognition area as well, may extract information on the first touch recognition area to be thereby provided to the system. Even though the touch in the first touch recognition area is identified, if no touch is identified in the second touch recognition area adjacent to the first touch recognition area, the touch controller 830 may determine that the change of the representative transistor in the first touch recognition area has not stemmed from the touch so that the information on the first touch recognition area is not provided to the system to thereby improve the precision of touch recognition.

The configuration of FIG. 10 is different from the configuration of FIG. 11 in the number of adjacent touch recognition areas. Therefore, the configuration of the touch recognition area may be variously configured in consideration of the accuracy of touch recognition, the size of the display panel, or the like. That is, the touch recognition area of the display panel may be configured to be variable, and the touch controller 830 may re-configure the touch recognition area according to the properties of images displayed in the display panel, or the properties of the transistors. For example, the touch controller 830 may change 1,000 touch recognition areas configured through the entire area of the display panel into 2,000 touch recognition areas of the display panel.

The sizes of the touch recognition areas may be configured to be different from each other unlike FIGS. 9 to 11. For example, the size of the touch recognition area in the center of the display panel, where the touch is frequently made, may be relatively small to enable precise touch recognition, whereas the size of the touch recognition area in the edge of the display panel, where the touch is seldom made, may be relatively large. According to another embodiment, the size of a certain touch recognition area may be different from the size of the touch recognition area adjacent thereto. The size of the touch recognition area in the display panel may be variously configured in consideration of the position thereof in the display panel, the adjacent touch recognition area, the precision of touch recognition, or the like, and the touch recognition area may be shaped into a hexagon as well as a square and a rectangle.

FIG. 12 illustrates a flowchart in which the timing controller recognizes the touch position in the sensing mode according to an embodiment disclosed herein.

The timing controller may control the sensing mode period and the display mode period, and may start the sensing operation in the sensing mode period (S1210). The sensed data of the pixels (the sub-pixels) is obtained through the sensing, and the change values of the representative transistors corresponding to K touch recognition areas of the display panel may be compared with the touch critical range using the sensed data (S1220). As a result of the comparison, the change value of the representative transistor is within the touch critical range, the information of the touch recognition area may be extracted to be provided to the system (S1230). If a difference value Δ extracted in Equation 1 is more than the value of "Touch_th_gt," or less than the value of "Touch_th_lt," which are critical values in which the touch can be recognized, as shown in Equation 2, the change value is determined to be within the critical range. The absolute values of "Touch_th_gt" and "Touch_th_lt" need not to be identical to each other, and may be independently configured according to the properties of the transistors of the display panel. The comparison of the change values of the representative transistors may be conducted with respect to all of the touch recognition areas. As described in the embodiments of FIGS. 10 and 11, in order to raise the touch recognition precision in the touch recognition area, when the change value of the representative transistor in the first touch recognition area is within the touch critical range, and the change value of the representative transistor adjacent to the first touch recognition area is within the touch critical range as well, it may be determined that the touch has been made in the first touch recognition area to thereby provide the information on the first touch recognition area to the system.

The information on the touch recognition area may be position information, but it is not limited thereto, and it may be identification information on the touch recognition area. In the case where the system, which receives the information, has information on the position of the touch recognition area, an identifier of the touch recognition area may be provided instead of the position information of the touch recognition area. For example, when the timing controller provides "TCA_100" as the identification information on the touch recognition area to the system, the system may retrieve position information on the touch recognition area from a memory therein on the basis of the received information. In addition, when the touch is identified in a plurality of touch recognition areas, information on the plurality of touch recognition areas may be provided. Therefore, information on the plurality of touch recognition areas may be provided to the system.

Afterwards, the sensing operation follows. After the sensing operation is performed, ouch recognition operations S1220 and S1230 may follow the same, but the order of operations may be re-configured according to the performance or the properties of the timing controller. The compensation data is created with respect to each pixel of the display panel using the sensed data (S1240), and the compensation data is output to the data driving unit (S1250) to perform the display mode. After the display mode is completed, when the sensing mode starts again, operations S1210 to S1250 of sensing, compensating, recognizing the touched transistor using the sensed data, and extracting the position information thereof may be performed.

In operation S1230 in which the information on the touch recognition area is extracted, in order to raise the touch recognition precision, it may be identified whether or not the touch is made in the adjacent touch recognition area as well, as set forth in FIGS. 10 and 11. That is, when the change value of the representative transistor in the first touch recognition area is within the touch critical range, and the change value of the representative transistor adjacent to the first touch recognition area is within the touch critical range as well, it may be determined that the touch has been made in the first touch recognition area to thereby extract the position information on the first touch recognition area. According to the embodiment of FIG. 12, since the touch recognition function is performed in addition to the sensing function in the sensing mode, the touch can be quickly detected without a separate process for detecting the touch in the touch panel.

By applying the present disclosure to the display panel of an organic light emitting display device adopting TFTs, the touch panel, which extracts information on the touch position using the increase in the mobility or the threshold voltage due to the change in the temperature of the TFTs, may be implemented. The present disclosure may be applied to oxide TFTs, but may not be limited thereto.

The embodiments of FIGS. 4 to 12 suggest technology in which the touch is recognized using the changed properties of the transistors in the corresponding position due to contact of the body or the touch pen, which emits a heat, or an infrared remote controller. The touch pen or the infrared remote controller may replace the body to emit a heat of a similar temperature to the body. Since the size of a touching means (e.g., fingers, pens, or the like) is different from the size of the pixel/sub-pixel controlled by the transistor, it is not necessary to identify the touch with respect to all of the transistors, and the touch may be identified by tracing the changes of the properties of the representative transistors in the partitioned areas of the touch recognition area in order to increase a touch recognition speed. For example, in the case of the touch recognition area partitioned into two pixel areas, the change of transistor of only the odd number pixel or the even number pixel may be identified to recognize the touch. In addition, in order to raise a touch recognition rate, the average of the change values of the transistors may be calculated. Alternatively, a plurality of representative transistors may be provided in the touch recognition area, and only if the change corresponding to the touch critical range occurs in each representative transistor, it may be determined that the touch has been made. In addition, it may be further identified whether or not the change of the representative transistor corresponding to the touch occurs in the touch recognition area adjacent to or surrounding a specific touch recognition area.

The timing controller may sense the properties of the transistor with respect to each pixel in every frame to thereby compare the same with the reference data, and the recognition of the touch may be determined through the comparison. To this end, the timing controller may have a critical value by which the touch recognition can be determined. The critical value may be configured according to the properties of the display panel. In addition, the reference data and the sensed data are compared with each other, and if the difference value is within the touch critical range, the touch may be determined to have been made, as shown in Equation 1, Equation 2, and FIGS. 5 and 6. In addition, the touch position information may be provided to the system to inform the outside of the touch position.

The description and the attached drawings are provided only to exemplarily describe the present invention, and it will be appreciated by those skilled in the art to which the present invention pertains that the present invention may be variously corrected and modified, for example, by coupling, separating, replacing, and changing the elements. Accordingly, the embodiments disclosed are merely to not limit but describe the present invention. Further, the scope of the present invention is limited by the claims. The scope of the present invention shall be construed on the basis of the accompanying claims in such a manner that all of the technical ideas included within the scope equivalent to the claims belong to the present invention.

What is claimed is:

1. A timing controller for a display panel comprising:
   a mode controller arranged to operate a display panel in one of a sensing mode or a display mode;
   a sensing controller arranged to obtain sensed data of a transistor that is included in a pixel of the display panel during the sensing mode, the transistor driving a light emitting element of the pixel during the display mode and the transistor corresponding to a touch recognition area of a plurality of touch recognition areas of the display panel, and the pixel that includes the transistor displaying a portion of an image during the display mode;
   a touch controller arranged to compare a change value of the sensed data with a touch critical range;
   wherein the touch controller is further arranged to extract position information or identification information on the touch recognition area if the change value is within the touch critical range, and
   wherein the sensed data of the transistor comprises at least one of a plurality of eigenvalues of the transistor.

2. The timing controller of claim 1 further comprising:
   a compensation unit arranged to create compensation data using the change value; and
   a panel driving unit arranged to output the compensation data to a data driving unit.

3. The timing controller of claim 1, wherein the touch recognition area has a plurality of the transistors corresponding thereto, and the touch controller is arranged to compare an average or intermediate value of change values of the data sensed in the transistors with the touch critical range.

4. The timing controller of claim 1, wherein the touch recognition area comprises one or more sub-pixel areas and the transistor is a driving transistor arranged to drive any one of the sub-pixel areas.

5. The timing controller of claim 4, wherein the touch recognition area corresponds to a single pixel area, and wherein the transistor is a driving transistor arranged to drive any one of the sub-pixel areas.

6. The timing controller of claim 1, wherein the touch recognition area corresponds a plurality of pixel areas, and wherein the pixel further comprises a plurality of transistors, the plurality of transistors being driving transistors that are selected from two or more of the plurality of pixel areas.

7. The timing controller of claim 6, wherein the touch controller, when a touch is identified in all of the transistors of the touch recognition area, extracts the position information or the identification information on the touch recognition area.

8. The timing controller of claim 1, wherein the plurality of touch recognition areas comprising a first touch recognition area and a second touch recognition area adjacent to the first touch recognition area, and wherein the touch controller is arranged to identify that a touch has been made in the first touch recognition area and the second touch recognition area, and when a touch is identified in the second touch recognition area the touch controller is arranged to extract information on the first touch recognition area.

9. An organic light emitting display device comprising:
   a display panel comprising a plurality of pixels defined by data lines in a first direction and gate lines in a second direction, and a plurality of touch recognition areas;
   a data driving unit that supplies a data voltage through the data lines;
   a gate driving unit that supplies a scan signal through the gate lines; and
   a timing controller that controls a driving timing of the data driving unit and the gate driving unit, controls a sensing mode and a display mode, and compares change values of sensed data of transistors that are included in the plurality of pixels of the display panel, which is sensed in the sensing mode, the transistors driving light emitting elements of the plurality of pixels during the display mode and the transistors corresponding to a plurality of touch recognition areas with a touch critical range to detect a touch, and wherein the plurality of pixels display an image during the display mode,
   wherein the sensed data of the transistor comprises at least one of a plurality of eigenvalues of the transistor.

10. A method of providing a touch detecting function for a display panel, the method comprising:
    starting a sensing mode of a display panel;
    obtaining sensed data of a transistor that is included in a pixel of the display panel during the sensing mode, the transistor driving a light emitting element of the pixel during a display mode and the transistor corresponding to a touch recognition area of the display panel;
    comparing a change value of the sensed data with a touch critical range;
    if the change value is within the touch critical range, extracting position information or identification information on the touch recognition area, and
    wherein the pixel that includes the transistor displays a portion of an image during a display mode of the display panel, and
    wherein the sensed data of the transistor comprises at least one of a plurality of eigenvalues of the transistor.

11. The method of claim 10 further comprising creating compensation data using the change value; and outputting the compensation data to a data driving unit.

12. The method of claim 10, wherein the extracting of the position information or the identification information on the touch recognition area further comprises, if a change value of another transistor of another touch recognition area adjacent to the touch recognition area is within the touch critical range, extracting position information or identification information on the touch recognition area.

13. The method of claim 10, wherein obtaining sensed data comprises comparing change values of a transistor corresponding to each of a plurality of touch recognition areas.

14. The method of claim 10, wherein the information extracted on the touch recognition area is provided to a system.

* * * * *